United States Patent [19]

Pozzetti

[11] 4,019,029
[45] Apr. 19, 1977

[54] MONITORING APPARATUS FOR CHECKING THE REGULARITY OF THE OPERATION OF LOGIC SYSTEMS

[75] Inventor: Mario Pozzetti, Bologna, Italy

[73] Assignee: Finike Italiana Marposs-Soc. In Accomandita Semplice di Mario Possati & C., Bentivogliio-S. Marino, Italy

[22] Filed: Nov. 14, 1975

[21] Appl. No.: 631,945

[30] Foreign Application Priority Data

Nov. 22, 1974 Italy .................................. 3524/74

[52] U.S. Cl. ...................... 235/92 PD; 235/92 PE; 235/92 R
[51] Int. Cl.² ......................................... G06M 3/02
[58] Field of Search .................. 235/92 PD, 92 PE; 340/267 R

[56] References Cited
UNITED STATES PATENTS

| | | | |
|---|---|---|---|
| 3,063,632 | 11/1962 | Stringer et al. | 235/92 PD |
| 3,659,081 | 4/1972 | Piccione | 235/92 PE |
| 3,952,944 | 4/1976 | Haruokoyanagi et al. | 235/92 PD |

Primary Examiner—Joseph M. Thesz
Attorney, Agent, or Firm—Stevens, Davis, Miller & Mosher

[57] ABSTRACT

The invention relates to logic systems used for controlling industrial processes and consists in a monitoring apparatus for checking the regularity of the operation of a logic system, in order to increase its safeness. The apparatus comprises a source of a clock signal, a series of comparison units for comparing logic signals, a detecting device including a counter for checking the presence of the clock signal at the output of the series of comparison units, a checking system means for simulating an alarm state and consent system for making the operation of the logic system depend on the working conditions of the monitoring apparatus. The invention is particularly useful for increasing the safeness of the operation of logic systems for machine tools.

12 Claims, 4 Drawing Figures

MONITORING APPARATUS FOR CHECKING THE REGULARITY OF THE OPERATION OF LOGIC SYSTEMS

The present invention relates to a monitoring apparatus, for checking the regularity of the operation of logic systems, comprising a source of a clock signal connected to a series of comparison units adapted to compare the signals of determined pairs or groups of logic signals, a detecting device adapted to check the presence of the clock signal at the output of said series, and alarm means connected to the output of the detecting device.

The aforementioned logic systems may be constituted, for example, by one or more automatic or semi-automatic machines or by elements for detecting and controlling the phases of an industrial process and by logic circuits connected to the machine or to said elements.

Apparatuses of the above mentioned type are already known. However they suffer from limits and drawbacks consisting in their complexity and in the lack of intrinsic safeness, since they are not sufficiently protected from failures of their components, or are protected through several redundant components.

It is therefore an object of the present invention to realize a monitoring apparatus particularly simple and effective and whose operation can be automatically checked.

Another object of the present invention is to realize an apparatus particularly suited to check the regularity of the operation of a logic system included in machines having a cyclic operation.

These and other objects and advantages are attained by a monitoring apparatus for checking the regularity of the operation of a logic system, comprising a source of a clock signal connected to a series of comparison units adapted to compare the signals of determined pairs of groups of logic signals; a detecting device adapted to check the presence of the clock signal at the output of said series; and alarm means connected to the output of the detecting device. The detecting device comprises counting means having a first input, of clock, connected to the source of the clock signal, a second input, of reset, connected to said output of the series and an output, of terminal count, connected to decoding means adapted to control said alarm means when the counting on said terminal count output reaches a predetermined value. The apparatus further includes first switching and consent means adapted to stop the operation of the logic system, checking means adapted to simulate an alarm state and second consent means connected to the first switching and consent means and to the checking means for making the continution of the operation of the logic system depend on the working conditions of the monitoring apparatus.

The invention will be described in more detail by reference to the attached drawings, in which.

Figure 1:
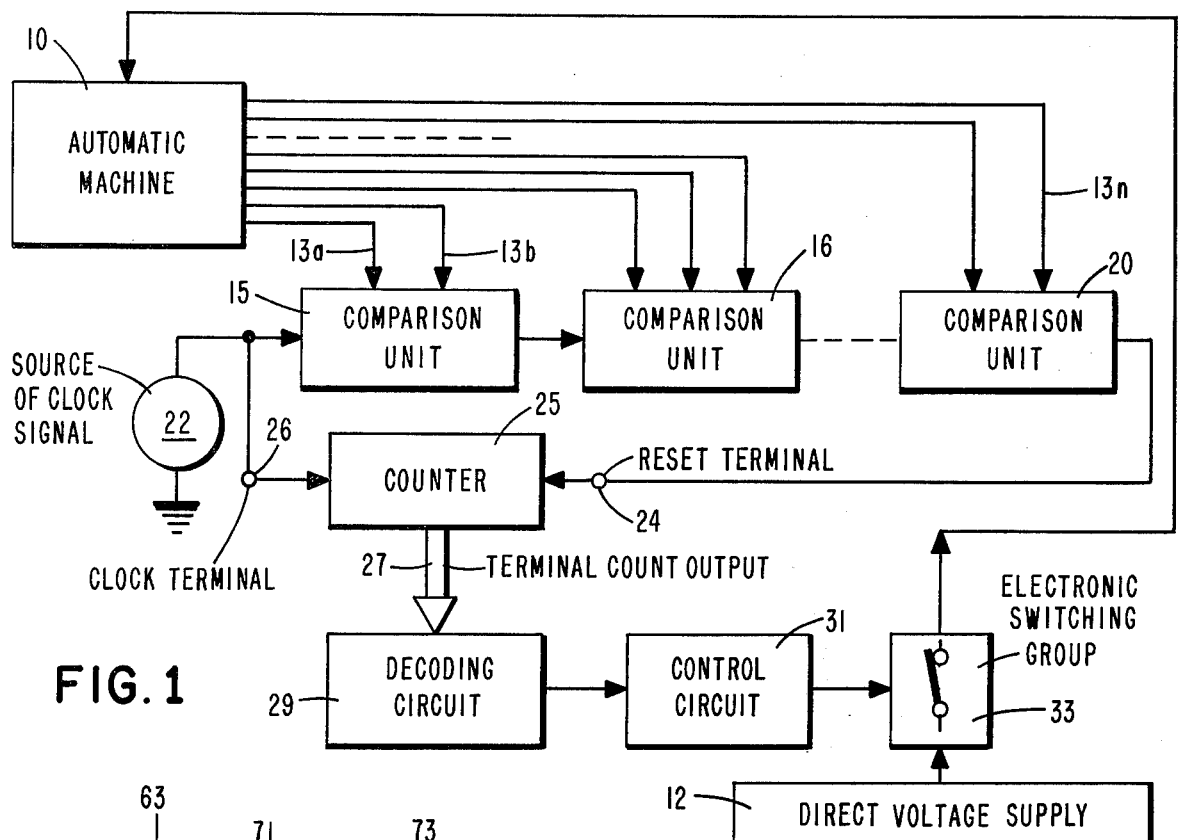
FIG. 1 is a block diagram of an appartus according to a preferred embodiment of the invention.

In FIG. 1, numeral 10 indicates an automatic machine, per se known, comprising logic and power circuits which control its operation.

The machine can be, for example, a grinder, a machine of a transfer line, or a machine adapted to carry out subsequent automatic, or semi-automatic, cycles of operation.

The logic and actuating circuits comprised in the machine 10 are fed by a direct voltage supply group 12.

A certain number of logic signals are taken from the logic circuits of the machine 10, by connections 13a, 13b, . . . 13n. Determined pairs or groups of these signals are fed to terminals of comparison units 15, 16, . . . 20.

These units 15, 16, . . . 20 are adapted to check, for example, whether the input and output signals of inverters included in the logic circuits of the machine 10 have complementary values, whether the input and output signals of amplifiers included in the same logic circuits have equal logic values and, in general, to check that determined "conditions" relating to the regular operation of the machine are respected.

Comparison unit 15 has an input connected to a source 22 of a clock signal constituted by square waves of a determined frequency, e.g. 1000 Hz.

The output of unit 15 is connected to the input of the subsequent unit 16, and so on. The output of last unit 20 is connected to a reset terminal 24 of a counter 25. A clock terminal 26 of counter 25 is connected to the output of source 22.

A terminal count output 27 of counter 25 is connected to a decoding circuit 29 which is connected, through a control circuit 31, to an electronic switching group 33 arranged between supply group 12 and machine 10.

The operation of the apparatus of FIG. 1 is as follows. The output signal of source 22, constituted by a sequence of square waves, reaches directly clock terminal 26 of counter 25; the same signal also reaches the reset terminal 24 if the comparisons made by units 15, 16, . . . 20 give positive results (that is, if the "conditions" relating to the regular operation of machine 10 are respected).

Counter 25, upon the arrival of a square wave at terminal 26 increases by 1 it count, but then it is immediately reset due to the arrival of the same square wave at terminal 24. Therefore the count on output 27 does not exceed, in normal conditions, the value 1.

If in machine 10 an abnormal situation takes place because of which at least one of the comparison units 15, . . . 20 carries out a comparison with negative result, or the comparison unit suffers a failure, the passage of the clock signal is barred.

Counter 25 is no more reset and counts the number of square waves emitted by source 22 from the instant in which the abnormal situation took place.

Figure 2:
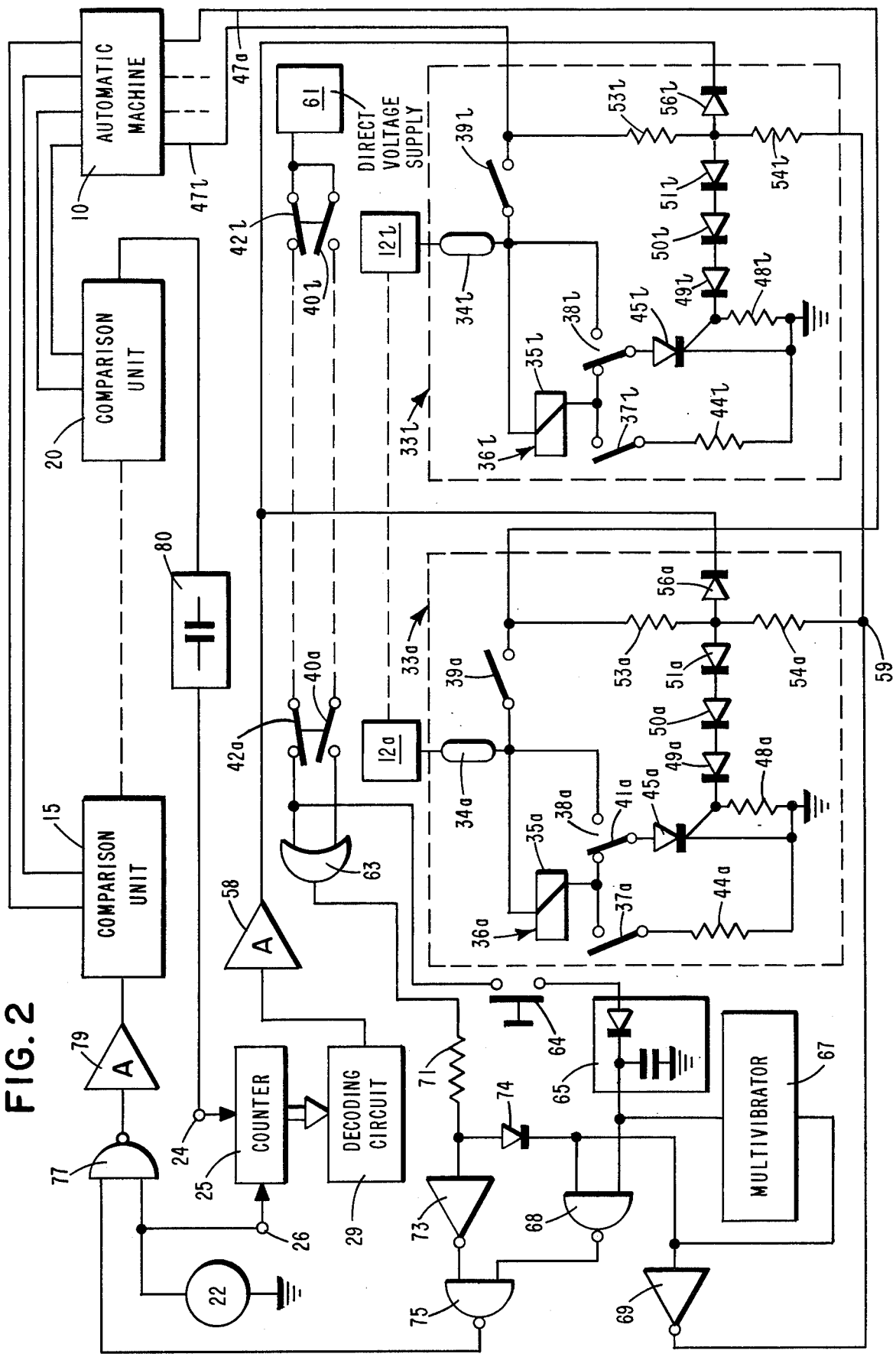
FIG. 2 is a more detailed scheme of the apparatus of FIG. 1.

When the count totalized on output 27 reaches a preset value, decoding circuit 29 switches over, energizing control circuit 31 which, by opening switch 33, turns off the electrical power to machine 10.

in FIG. 2 some circuits of the apparatus of FIG. 1 are shown in more detail and there are also shown circuits which permit one to check the working conditions of the apparatus itself when machine 10 is started.

The direct voltage supply group 12 of FIG. 1 comprises in practice different supplis 12a, . . . 12l; the electronic switching group 33 too is constituted, in practice, by different units 33a, . . . 33l which also comprise components of control circuit 31 of FIG. 1, as explained hereinafter.

Unit 33a comprises a thermal circuit breaker 34a connected in series with supply 12a and the winding 35a of a remote control switch 36a having six contacts, four of which, 37a, 38a, 39a, 40a, open under rest conditions and two, 41a, 42a, closed under rest conditions.

Contact 37a is connected in series between an end of the winding of remote control switch 36a, a saving resistance 44a and ground.

Contact 41a is connected in series with the anode-cathode path of a controlled diode 45a and in parallel with the series circuit constituted by contact 37a and resistor 44a.

Contact 38a is connected between an end of thermal circuit breaker 34a and the anode of diode 45a.

Contact 39a is arranged downstream of thermal circuit breaker 34a, in connection 47a between supply 12a and one or more circuits being part of machine 10.

The control terminal of controlled diode 45a is connected to ground through a resistance 48a and is also connected to the cathode of a diode 49a arranged in series with two other diodes 50a, 51a connected so as to permit the current to flow in the same direction as diode 49a.

The anode of diode 51a is connected to the common point of two resistances 53a, 54a and to the anode of another diode 56a whose cathode is connected to the output of an amplifier 58. The input of amplifier 58 is connected to the output of decoding circuit 29.

The second end of resistance 53a is connected, downstream of contact 39a, to connection 47a. Resistances 54a . . . 54l are connected to a node 59.

Contacts 42l . . . 42a are connected in series between a direct voltage source 61 and an input of an OR circuit 63. Another input of OR circuit 63 is connected in series, through contacts 40a . . . 40l, with source 61.

The first input of OR circuit 63 is connected, through a push-button contact 64 open under rest conditions and an asymmetric delay circuit 65, to the input of a monostable multivibrator 67 whose output is connected to an input of a NAND circuit 68.

Another input of NAND 68 is directly connected to the output of delay circuit 65.

An inverter 69 is connected, at its input, to the output of multivibrator 67 and at its output to node 59.

The output of OR 63 has in series a resistnce 71 terminating at the input of an inverter 73, which is also connected to the anode of a diode 74 the cathode of which is connected to the output of multivibrator 67.

The output of inverter 73 and that of NAND 68 are connected, respectively, to the two inputs of a NAND 75.

The output of NAND 75 is connected to a first input of another NAND 77; a second input of NAND 77 receives the clock signal of source 22, which besides reaches directly the clock terminal 26 of counter 25.

The output of NAND 77 is connected, through an amplifier 79, to the input of comparison unit 15.

A filter circuit 80 adapted to block the direct voltages is connected between comparison unit 20 and reset terminal 24. By pressing push-button 64 when contacts 39 are open the checking of the working conditions of the apparatus is automatically achieved and, if the checking is positive, the connection between supplies 12 and machine 10 is established. In fact, by closing push-button contact 64, a positive level of voltage is fed, through contacts 42l, . . . 42a, to the input of monostble multivibrator 67; the front of the positive level voltage causes the emission of a rectangular pulse, having a duration τ (for example, of 10 msec) and logic level 0, from the multivibrator output, which normally is at the logic level 1.

For the time τ, the 0 pulse keeps the output of NAND 68 and the output of inverter 73 at logic level 1. Therefore for the whole time τ the output of NAND 75 is at the level 0, which prevents the passage of the clock signal, provided by source 22, through NAND 77. During the time τ, counter 25 receives the square waves, emitted by source 22, at terminal 26 and does not receive them at terminal 24.

Therefore on output 27 the count of the square waves increases. When the count reaches a preset value, for example 2 or 3, decoding circuit 29 switches over providing a voltage of logic level 1 to amplifier 58.

In substance a simulation of alarm is made in this way.

Amplifier 58, together with some components of units 33a, . . . 33l, constitutes the control circuit 31 of FIG. 1, as it will appear evident hereinafter.

Moreover, the zero pulse of duration τ emitted by multivibrator 67 biases the output of inverter 69, and thus node 59, to the logic level 1.

Consequently, and since from a certain instant of the time interval τ onwards the output of amplifier 58 is at logic level 1 (therefore diode 56a is blocked), current flows from that instant through resistance 54a and diodes 51a, 50a, 49a and fires controlled diode 45a.

The latter (and similarly the other diodes 45b, . . . 45l) is crossed by the current delivered by supply 12a; this current flows through winding 35a of remote control switch 36a and contact 41a. Remote control switches 36a, 36b, . . . 36l are energized causing, with a certain delay due to reasons of inertiae, the switching over of contacts 37–42.

If the time τ elapses before the termination of the switching, the input of NAND 68, connected to the output of multivibrator 67, goes back to level 1 and node 59 to level 0.

The other input of NAND 68 remains for a certain time at level 1, maintained there by asymmetric delay circuit 65 which provides voltage even after the reopening of push-button contact 64 or the opening of contacts 42.

In consequence of that, the output of NAND 75 goes to level 1, which permits the passage through NAND 77 of the clock signal emitted by source 22. At the end of the delay due to circuit 65, the output voltage of NAND 68 goes to logic level 1, but since the delay is chosen in such a way as to assure the completion of the switching, in the meanwhile contacts 40 closed thus causing the output voltage of inverter 73 to reach level 0.

Therefore, after the time τ the passage through NAND 77 of the signal emitted by source 22 is anyhow assured. So counter 25 is reset and the voltage at the output of the amplifier 58 goes back to level 0.

When the switching of contacts 35–42 terminates, contacts 39, which are closed, permit the delivery of the power from supplies 12 to machine 10. Current flows through resistances 53 too and closes passing through diodes 56 which have the cathodes at the level 0 present at the output of amplifier 58.

Controlled diodes 45, which had been blocked during the switching, remain in this condition.

However the closure of contacts 37 permits the passage, through windings 35 of remote control switches 36 and saving resistances 44, of a current sufficient to maintain contacts 37–42 in the reached position.

In normal operating conditions push-button 64 is open and contacts 40 are closed.

The monitoring apparatus is then ready to act in case of failures or irregularities which prevent the arrival of the clock signal at the reset terminal 24 of counter 25. In this case the attainment of the logic level 1 at the output of amplifier 58 causes the firing of controlled diodes 45 which turn off at once the power to logic system 10 by connecting to ground suplies 12 till thermal breakers 34 open. Contacts 37–42 of every remote control switch 36 are mechanically linked to each other, as it is shown by way of illustration for contacts 40, 42; if one of remote control switches 36 is damaged due to a failure during the operation of machine 10, with the consequent opening of contact 40i, the monitoring apparatus goes into the condition of alarm.

In fact, in this case logic level 0 is present at the output of OR 63; level 1 is present at the two inputs of NAND 75 and therefore at the output of NAND 75 there is present a logic signal 0, which prevents the passage of the clock signal towards the series of the comparison units 15–20.

From what is said above, it is evident that the operations occurring from the instant in which push-button 64 is pressed till the closing of contacts 39 also serve to check the working conditions of the monitoring apparatus.

In fact by the examination of FIG. 2 it can be noticed that any fault of the apparatus prevents the establishment of the connection between supplies 12 and machine 10.

For example, before the operation of push-button 64, if contacts 37–42 of anyone of remote control switches 36 are not in the normal rest position, the operation of push-button 64 does not cause the energization of remote control switches 36 because the output of multivibrator 67 remains at the logic level 1 and node 59 at level 0.

The working conditions of pulse source 22, counter 25 and decoding circuit 29 are checked since only the above described occurrence of a simulated alarm permits the firing of controlled diodes 45 and the consequent establishment of the connection between supplies 12 and machine 10.

Figure 3:
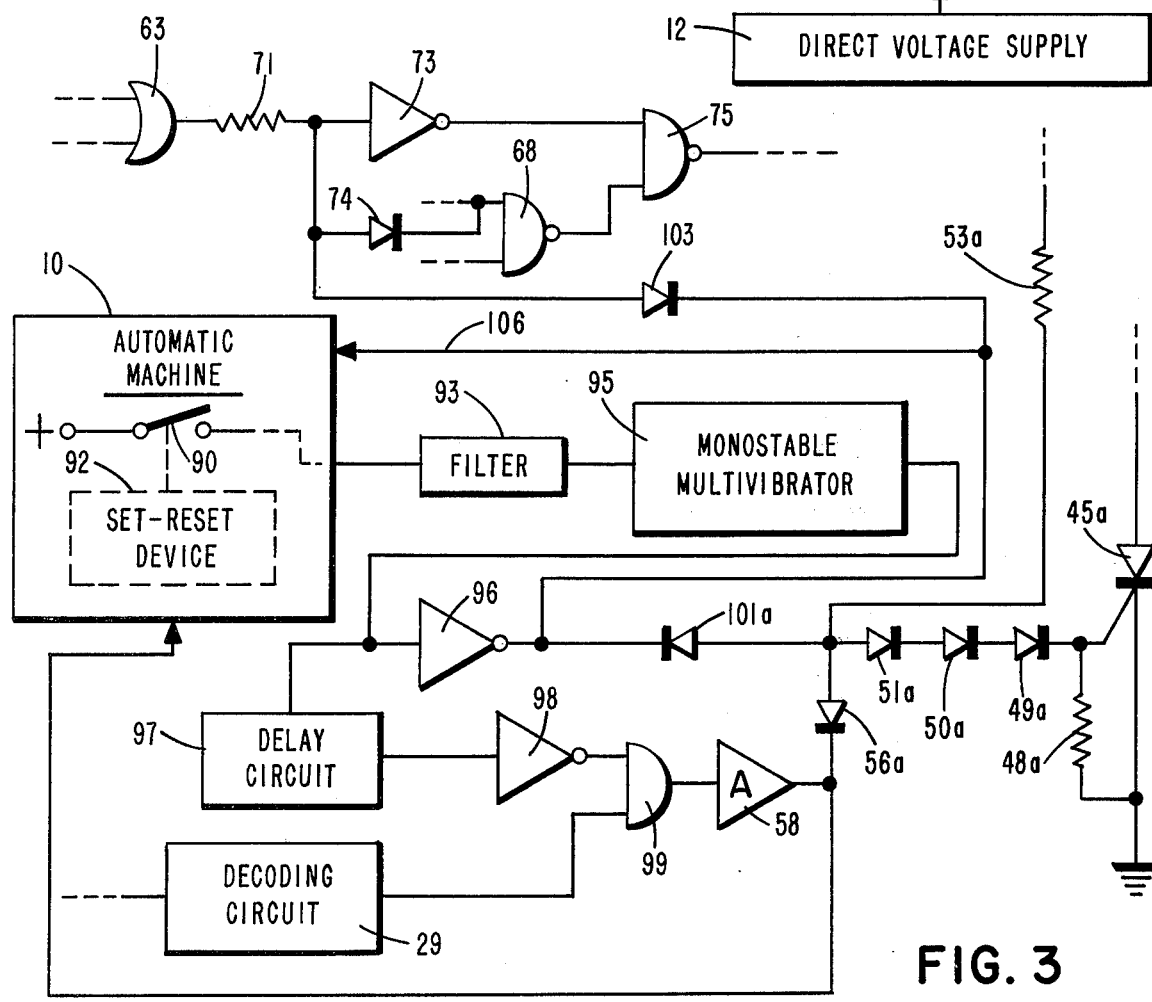
FIG. 3 shows a part of the apparatus of FIG. 2, in which there are comprised some variants, particularly adapted for the use in machines having cyclic operation.

With reference to FIG. 3, a circuit is now described adapted to carry out, at the start of every operating cycle of machine 10, a checking of the operating conditions of the monitoring apparatus.

Machine 10 includes a limit switch contact 90 which is closed at the end of the last operation of the preceding operating cycle of the machine.

Contact 90 is connected to a SET-RESET device 92 adapted to reset, as soon as contact 90 closes, the logic circuits of machine 10, so preventing the starting of a new operating cycle.

Contact 90 is also connected, through a filter 93, to the input of a monostable multivibrator 95.

The output of multivibrator 95 is connected to an inverter 96 and, through a symmetric delay circuit 97 and an inverter 98, to the input of an AND circuit 99 which receives, at another input, the output signal of decoding circuit 29 of FIG. 2.

The output of AND circuit 99 is connected to the input of amplifier 58.

As in the apparatus of FIG. 2, diodes 56 are connected between the output of amplifier 58 and the common points between resistances 53 and diodes 49 (for the sake of simplicity only one controlled diode 45a and one diode 56a are represented in FIG. 3).

The common points between resistances 53 and diodes 56 are connected, through relevant diodes 101, to the output of inverter 96.

Diodes 101 are arranged so as to have the cathodes directly connected to the output of inverter 96. The output of inverter 96 is also connected to the cathode of a diode 103, the anode of which is connected to the input of inverter 73 of FIG. 2.

Figure 4:
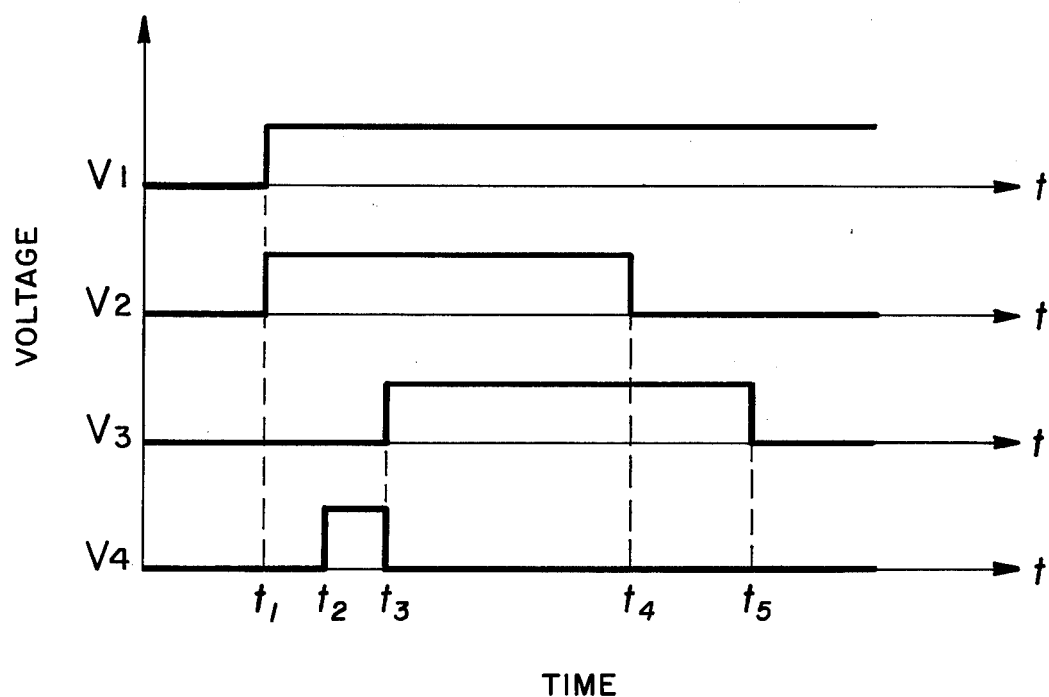
FIG. 4 shows some diagrams with the time as a variable adapted to illustrate the operation of the apparatus of FIG. 3.

Moreover, the apparatus of FIG. 3 comprises, without further variants, the other circuits described with reference to FIG. 2. The operation of the circuit of FIG. 3 is now described with reference to the diagrams of FIG. 4.

At the end of every cycle of machine 10 (instant $t_1$ in the diagrams of FIG. 4) contact 90 closes so causing the voltage $V_1$, at the input of SET-RESET device 92 and the input of filter 93, to reach logic level 1.

Then device 92 removes the consent for the starting of a new machine cycle.

Monostable multivibrator 95, which receives the filtered voltage $V_1$, and which before $t_1$ had its output voltage $V_2$ at the logic level 0, furnishes for a time $t_4 - t_1$ a rectangular pulse of logic level 1. The logic level 0 is present, in the interval $t_4 - t_1$, at the output of inverter 96. Consequently, also the input of inverter 73 is shifted for the time from $t_1$ to $t_4$ to logic level 0 through diode 103.

For the whole interval $t_4 - t_1$ the two inputs of NAND 75 are at logic level 1 and the output of the same NAND is at logic level 0.

This prevents the passage of the clock signal furnished by source 22 through NAND 77 and towards the comparison unis 15, . . . 20, as already described with reference to FIG. 2. Counter 25 receives the clock signal at terminal 26 and does not receive it at terminal 24.

Therefore the count increases and as soon as it reaches a predetermined value (instant $t_2$ in FIG. 4) decoding circuit 29 switches over to provide a voltage of logic level 1 to a input of AND 99.

Voltage $V_3$ present at the output of delay circuit 97 is delayed for a time of $t_3 - t_1$ with respect to voltage $V_2$. The delay of circuit 99 is determined so that $t_3 - t_1$ is sufficiently longer for the reasons explained hereinafter, than $t_2 - t_1$.

Therefore at the instant $t_2$ logic level 1 is present at the second input of AND 99 too. In substance even now a simulation of alarm is obtained.

Logic level 1 is present at the output of amplifier 58 for time $t_3 - t_2$. This signal is received by device 92, which enables (sets) again the logic circuits of machine 10 to start a new operating cycle.

In the same time $t_3 - t_2$ the current flowing through resistances 53 closes its path through diodes 101, thus avoiding the firing of controlled diodes 45.

At instant $t_3$ the voltage at the output of inverter 98 reaches level 0. Therefore also voltage $V_4$ at the output of amplifier 58 goes back to level 0.

At instance $t_4$ the output of multivibrator 95 goes back to level 0. As a consequence the output of inverter 96 goes back to level 1 and the clock signal passes again through NAND 77.

Counter 25 is then reset within the time between $t_4$ and $t_5$. It is of course: $(t_5 - t_4) = (t_3 - t_1)$.

At the instant $t_5$ the voltage at the output of inverter 98 goes back to level 1. However, the output of amplifier 58 remains at level 0 since in the meanwhile counter 25 has been reset.

Therefore the operating cycle of the machine can regularly go on. The prosecution of the cycle is also made dependent, through a connection 106 between the output of inverter 96 and machine 10, on the return and the maintainment of logic level 1 at this output.

By means of the above sequence of operations, the actual connection of supplies 12 and the working condition of counter 25, alarm amplifier 58 and the other components of the monitoring apparatus are checked.

By observing FIGS. 2 and 3 it can also be noticed that any failure of the components of the control circuit of FIG. 3 causes the alarm (the real alarm, not that simulated) to take place, or the lack of the consent, from device 92, for the starting of a new cycle, or it prevents the starting of the cycle even in presence of the consent.

It is evident that the described apparatus can undergo changes and variants equivalent from a functional and structural point of view without departing from the spirit of the invention.

What is claimed is:

1. A monitoring apparatus for checking the regularity of the operation of a logic system, comprising a source of a clock signal, a series of comparison units connected to said source adapted to compare the signals of determined pairs or groups of logic signals; a detecting device adapted to check the presence of the clock signal at the output of said seris; alarm means connected to the output of the detecting device, said detecting device comprising counting means having a first input, of clock, connected to the source of the clock signal, a second input, of reset, connected to said output of the series, and an output of terminal count connected to decoding means adapted to control said alarm means when the counting on said terminal count output reaches a predetermined value, first switching and consent means adapted to stop the operation of the logic system; checking means adapted to simulate an alarm state and second consent means connected to the first switching and consent means and to the checking means for making the continuation of the operation of the logic system depend on the working conditions of the monitoring apparatus.

2. The apparatus according to claim 1, including a supply group and wherein said alarm means includes at least a first switching group adapted to connect said supply group to said logic system, said switching group including an electronic switch adapted to be controlled by the output signal of said decoding means, and at least an electro-mechanical switch adapted to be operated upon the switching of said switching group.

3. The apparatus according to claim 2, wherein said electro-mechanical switch includes a contact adapted to establish a connection between said supply group and said logic system, said electronic switch including a control terminal connected to said decoding means and two other terminals adapted to establish a by-pass circuit for said connection, said by-pass circuit including another contact and an energizing element of the electro-mechanical switch.

4. The apparatus according to claim 1, including a supply group and an electronic switch and wherein said alarm means comprises at least a switching group adapted to connect said supply group to said logic system, said switching group including; a mulit-contact electro-mechanical switch including an energizing winding connected to said supply group; a first contact; a saving resistance, said first contact in series with said saving resistance and connected to said energizing winding to maintain the latter energized; a second contact connected to said energizing winding and to said electronic switch including a control terminal connected to said decoding means, for controlling the energization of said electro-mechanical switch; a third contact arranged in a connection between said supply group and said logic system; and a fourth contact adapted to connect said supply group to said electronic switch for rapidly turning off the power provided by supply group to the logic system upon the occurrence of an alarm condition.

5. The apparatus according to claim 1, including a monostable multivibrator, a gate circuit and wherein said checking means comprises a timer circuit adapted to provide an inhibit signal to said gate circuit for temporaneously inhibiting the passage of said clock signal toward one of said first and second inputs of said counting means.

6. The apparatus according to claim 5, including at least one supply group and a connection between said supply group and said logic system, said first switching and consent means including a switch adaped to interrupt the connection between said supply group and said logic system and said checking means including a control device for controlling the accomplishment of a checking of the working conditions of the apparatus and the establishment of said connection, said control device being connected to said monostable multivibrator adapted to provide said inhibit signal.

7. The apparatus according to claim 6, including electronic switching circuits the output of said monostable multivibrator being connected, through said electronic switching circuits, to said switch for controlling the establishment of said connection.

8. The apparatus according to claim 7, wherein said decoding means has an output connected to one of said electronic switching circuits for providing a first consent signal to the control of the establishment of said connection and a second consent signal for maintaining the connection during the normal operating conditions.

9. The apparatus according to claim 6, including circuits associated with said gate circuits and wherein said switch includes a first group of contacts for connecting relevant supply groups to the logic system, a second group of contacts connected in series with said control device for making the starting of the operations of the logic system depend on a determined initial condition of said switch, and a third group of contacts connected in series at the input of said circuits associated with said gate circuits for providing a consent to the prosecution of the operation of the logic system.

10. Apparatus according to claim 5, wherein said logic system operates cyclically, said first switching and consent means including a stop device adapted to stop the operation of the logic system at the end of every working cycle, said stop device being operatively connected to said timer circuit for controlling the emission of said inhibit signal at the end of every working cycle and the consequent checking of the working conditions of the monitoring apparatus through an alarm simulation.

11. The apparatus according to claim 10, wherein said second consent means includes a combinatory logic circuit, said decoding means being connected through a combinatory logic circuit, to said stop device for providing a reset signal after the simulation of alarm.

12. The apparatus accordng to claim 11, including a delay circuit, said combinatory logic circuit being connected through said delay circuit, to the output of said timer circuit for providing a consent signal for the starting of the working cycle of the logic system.

* * * * *

UNITED STATES PATENT AND TRADEMARK OFFICE
CERTIFICATE OF CORRECTION

PATENT NO. : 4,019,029
DATED : April 19, 1977
INVENTOR(S) : Mario POZZETTI

It is certified that error appears in the above-identified patent and that said Letters Patent are hereby corrected as shown below:

[73]   Cancel "Bentivogliio" in line 3 and insert
       -- Bentivoglio --.

Column 2, line 48, cancel "it" (first occurrence) and insert -- its --.

Column 2, line 65, cancel "in" and insert -- In --

Column 3, line 2, cancel "supplis" and insert -- supplies --.

Column 3, line 52; correct spelling of -- resistance --.

Column 4, line 6, correct spelling of -- monostable --.

Column 5, line 17, correct spelling of -- supplies -- .

Column 6, line 42, correct spelling of -- units --.

Column 7, line 38, (line 7 of claim 1) correct spelling of -- series --.

Column 8, line 7 (line 5 of claim 4) correct spelling of -- multi- --.

Column 10, line 3 (line 1 of claim 12) correct spelling of -- according --.

Signed and Sealed this nineteenth Day of July 1977

[SEAL]

Attest:

RUTH C. MASON
*Attesting Officer*

C. MARSHALL DANN
*Commissioner of Patents and Trademarks*